United States Patent
Balazs et al.

(10) Patent No.: US 8,799,639 B2
(45) Date of Patent: Aug. 5, 2014

(54) METHOD AND APPARATUS FOR CONVERTING AUTHENTICATION-TOKENS TO FACILITATE INTERACTIONS BETWEEN APPLICATIONS

(75) Inventors: Alex G. Balazs, Plymouth, MA (US); Zane Z. Y. Pan, Lexington, MA (US)

(73) Assignee: Intuit Inc., Mountain View, CA (US)

( * ) Notice: Subject to any disclaimer, the term of this patent is extended or adjusted under 35 U.S.C. 154(b) by 1467 days.

(21) Appl. No.: 11/493,693

(22) Filed: Jul. 25, 2006

(65) Prior Publication Data

US 2008/0046715 A1  Feb. 21, 2008

(51) Int. Cl.
*H04L 9/00* (2006.01)
*G06F 21/41* (2013.01)
*G06F 21/33* (2013.01)

(52) U.S. Cl.
CPC ............... *G06F 21/41* (2013.01); *G06F 21/33* (2013.01)
USPC .......................................... 713/152; 713/156

(58) Field of Classification Search
CPC ................................. G06F 21/41; G06F 21/33
USPC .......... 713/150, 152, 182; 711/100, 104, 112, 711/145, 150; 709/211, 212, 216, 217, 219; 726/2, 27, 34; 380/229, 232, 247, 258
See application file for complete search history.

(56) References Cited

U.S. PATENT DOCUMENTS

| | | |
|---|---|---|
| 2001/0000358 A1 | 4/2001 | Isomichi et al. |
| 2002/0156905 A1 | 10/2002 | Weissman |
| 2003/0177388 A1* | 9/2003 | Botz et al. ...................... 713/201 |
| 2006/0041933 A1 | 2/2006 | Yakov et al. |
| 2006/0179312 A1* | 8/2006 | Kelly et al. ..................... 713/169 |
| 2007/0255958 A1* | 11/2007 | Schmidt et al. ................ 713/183 |
| 2007/0271618 A1* | 11/2007 | Chao et al. ........................ 726/27 |
| 2007/0294528 A1* | 12/2007 | Shoji et al. ..................... 713/159 |
| 2008/0010665 A1* | 1/2008 | Hinton et al. ...................... 726/1 |
| 2008/0109895 A1* | 5/2008 | Janevski .......................... 726/19 |
| 2008/0134305 A1* | 6/2008 | Hinton et al. ...................... 726/5 |

FOREIGN PATENT DOCUMENTS

| | | |
|---|---|---|
| WO | 0152025 A3 | 7/2001 |
| WO | 0239237 A3 | 5/2002 |

\* cited by examiner

*Primary Examiner* — Jeffrey Pwu
*Assistant Examiner* — Nega Woldemariam
(74) *Attorney, Agent, or Firm* — Park, Vaughan, Fleming & Dowler LLP (57) ABSTRACT

One embodiment of the present invention provides a system that converts authentication-tokens to facilitate interactions between applications. During operation, the system receives a command-execution request from a first application, wherein the command-execution request specifies a command to execute on a second application. Subsequently, the system verifies a first authentication-token included with the command-execution request. Next, the system translates the first authentication-token into a form associated with the second application to produce a second authentication-token. The system then modifies the command-execution request by replacing the first authentication-token with the second-authentication-token to create a modified command-execution request. Then, the system sends the modified command-execution request to the second application.

26 Claims, 4 Drawing Sheets

METHOD AND APPARATUS FOR CONVERTING AUTHENTICATION-TOKENS TO FACILITATE INTERACTIONS BETWEEN APPLICATIONS

BACKGROUND

Related Art

Many applications perform operations which involve contacting another application. Often, each of these applications has its own distinct user-authentication procedure. Thus, when a user activates a feature in a first application, and the feature communicates with a second application, the second application often requires the user to re-authenticate. For example, a tax-preparation application may include the ability to perform operations which involve communicating with a financial application, but in order for a user who is already authenticated by the tax-preparation application to perform these operations, the user must first re-authenticate with the financial application.

Hence, each time an application communicates with another application, the user may have to re-authenticate. This need to re-authenticate prevents an organization from providing a seamless user experience, and can be time-consuming and inconvenient for a busy user.

SUMMARY

One embodiment of the present invention provides a system that converts authentication-tokens to facilitate interactions between applications. During operation, the system receives a command-execution request from a first application, wherein the command-execution request specifies a command to execute on a second application. Subsequently, the system verifies a first authentication-token included with the command-execution request. Next, the system translates the first authentication-token into a form associated with the second application to produce a second authentication-token. The system then modifies the command-execution request by replacing the first authentication-token with the second-authentication-token to create a modified command-execution request. Then, the system sends the modified command-execution request to the second application.

In a variation on this embodiment, the first application is located on the same computer system as the second application.

In a variation on this embodiment, the command-execution request from the first application can include: a target Uniform Resource Locator (URL) which specifies the location of the second application; a first authentication-token type which specifies a form of the first authentication-token; a second authentication-token type which specifies a form of the second authentication-token; a user identifier for a user who is associated with the first authentication-token; payload data for the second application; and the command.

In a variation on this embodiment, verifying the first authentication-token involves identifying a first authentication-token type for the first authentication-token. Next, the system uses decryption rules associated with the first authentication-token type to decrypt the first authentication-token to obtain a decrypted first authentication-token. Subsequently, the system verifies the validity of the decrypted first authentication-token.

In a further variation, verifying the validity of the decrypted first authentication-token can involve verifying that the decrypted first authentication-token has not expired, and verifying that the decrypted first authentication-token is associated with a user identifier.

In a variation on this embodiment, translating the first authentication-token involves identifying a second authentication-token type which specifies a form of the second authentication-token for the second application. Next, the system identifies a second user identifier which is mapped to a first user identifier, wherein the first user identifier is associated with the first authentication-token. The system then creates the second authentication-token, wherein the second authentication-token is associated with the second user identifier, wherein the second authentication-token is of the form specified by the second authentication-token type.

In a further variation, creating the second authentication-token involves requesting the second authentication-token from a third-party authentication-token provider. Subsequently, the system receives the second authentication-token from the third-party authentication-token provider.

In a further variation, the second user identifier is the same as the first user identifier.

In a variation on this embodiment, the first authentication-token and the second authentication-token can include a cookie, a digital certificate, a user-name/password pair, a cryptographic key, and a biometric identifier.

In a variation on this embodiment, modifying the command-execution request involves modifying the command to have a format associated with the second application. Subsequently, the system includes the modified command with the modified command-execution request.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention provides a Single Sign-on Session Bridge, hereinafter referred to as a "bridge," which solves the problem of bridging distinct domains associated with various security tokens. The bridge accomplishes this by securely translating a security token from one domain to another, and/or translating one type of security token to another type of security token.

For example, in one embodiment of the present invention, when a user clicks a link associated with an application, the application posts a session-token, or authentication-token, to the bridge. In this embodiment, the bridge can live in a virtual domain of the destination system, wherein the destination system hosts a second application, and wherein the link refers to the destination system. The bridge is then able to translate the authentication-token into a form associated with the destination system. Using the translated authentication-token, the bridge authenticates the user to the destination system, and subsequently, redirects the user to the destination system.

Computer System

Figure 1:
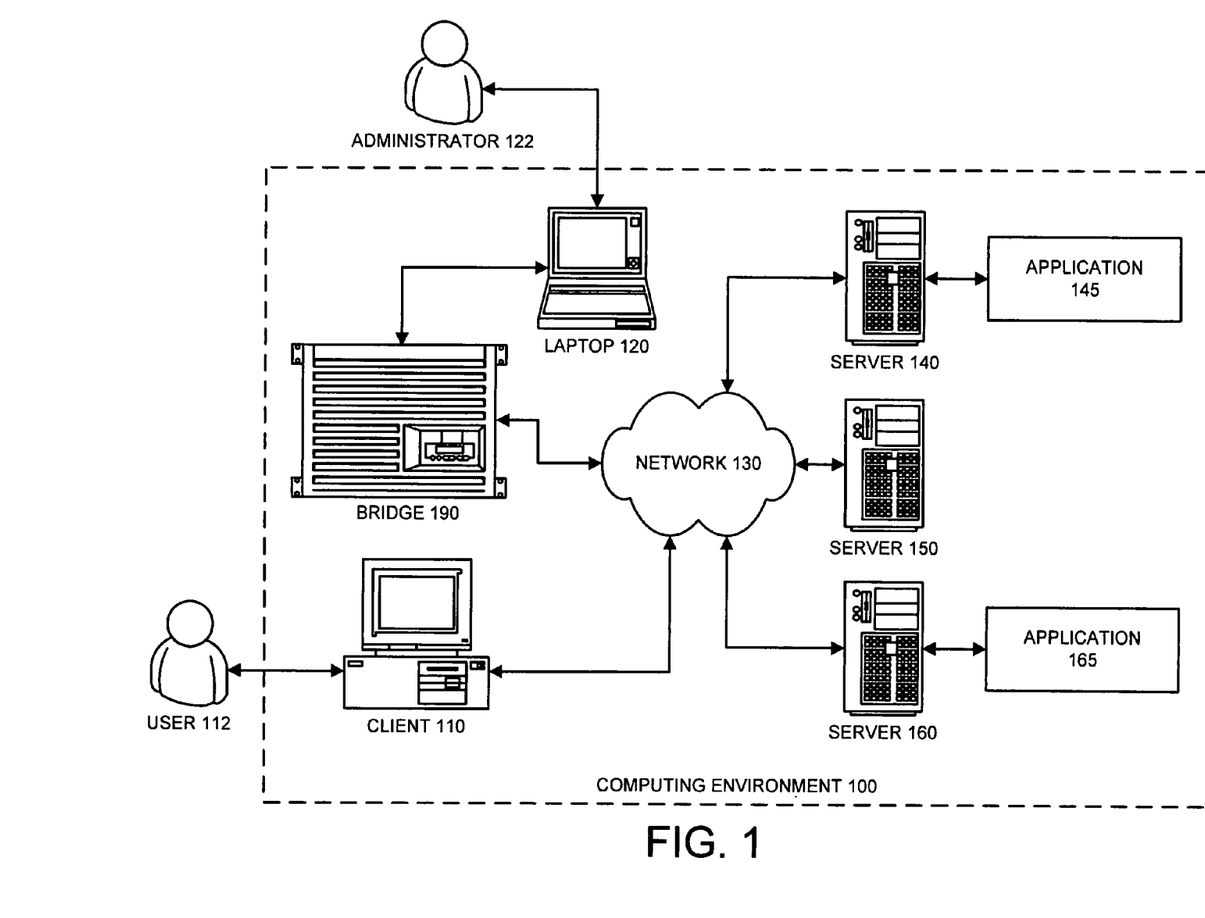
FIG. 1 illustrates a computing environment in accordance with an embodiment of the present invention.

FIG. 1 illustrates a computing environment 100 in accordance with an embodiment of the present invention.

Computing environment 100 can generally include any type of computer system which can comprise a computer system based on a microprocessor, a mainframe computer, a digital signal processor, a portable computing device, a personal organizer, a device controller, and a computational engine within an appliance. Specifically, computing environment 100 can comprise client 110, laptop 120, network 130, server 140, server 150, server 160, application 145, application 165, and bridge 190.

Client 110 and laptop 120 can generally include any node on a network including computational capability and including a mechanism for communicating across the network.

Network 130 can generally include any type of wired or wireless communication channel capable of coupling together computing nodes. This includes, but is not limited to, a local area network, a wide area network, or a combination of networks. In one embodiment of the present invention, network 130 comprises the Internet.

Servers 140, 150, and 160 can generally include any nodes on a computer network which comprises a mechanism for servicing requests from a client for computational and/or data storage resources.

Applications 145 and 165 can generally include any computer program. In one embodiment of the present invention, server 140 executes application 145, and server 160 executes application 165.

In one embodiment of the present application, applications 145 and 165 are instances of the same application.

In one embodiment of the present application, applications 145 and 165 are instances of different applications.

In one embodiment of the present application, applications 145 and 165 are components of the same application.

Bridge 190 can generally include any system that receives an authentication-token in a form associated with a first application 145 and translates the authentication-token to a form associated with a second application 165. In one embodiment of the present invention, bridge 190 can be an application hosted by client 110, laptop 120, or a server, such as server 140.

In one embodiment of the present invention, user 112 accesses application 145 via client 110. Before user 112 can begin using application 145, user 112 authenticates to application 145, which involves application 145 creating an authentication-token associated with user 112. While using application 145, user 112 clicks on a link that directs application 145 to send a command-execution request to bridge 190 that includes the authentication-token and a command for application 165 to execute. Bridge 190 then converts the authentication-token into a form that application 165 can process. Next, bridge 190 sends a modified command-execution request to application 165 which includes the converted authentication-token as well as the command for application 165 to execute.

In one embodiment of the present invention, in response to receiving the authentication-token from application 145, bridge 190 requests a second authentication-token from a third-party system, such as server 150, wherein the second authentication-token is in a form associated with application 165. Server 150 then sends the second authentication-token to bridge 190, which subsequently, sends the second authentication-token to application 165 along with the command for application 165 to execute.

In one embodiment of the present invention, administrator 122 provides rules to bridge 190 via laptop 120. These rules instruct bridge 190 on how to convert authentication-tokens into other types of authentication-tokens.

In one embodiment of the present invention, bridge 190 can present user 112 with a user-interface associated with bridge 190, application 145, or application 165. In one embodiment of the present invention, this user-interface is non-interactive. In this embodiment, the user-interface can provide user 112 with a status report for the command-execution request, or a splash screen associated with application 145, application 165, or bridge 190.

In one embodiment of the present invention, the user-interface is interactive. In this embodiment, user 112 can provide information to bridge 190 via the user-interface. Bridge 190 can use the information to facilitate processing of the command-execution request.

In one embodiment of the present invention, the command-execution request includes data that enables bridge 190 to customize the user-interface.

In one embodiment of the present invention, bridge 190 does not present a user-interface to user 112. In this embodiment, user 112 may not be aware of the existence of bridge 190. This embodiment allows an organization to provide a seamless experience to user 112 while using multiple applications.

Translating a Command-Execution Request

Figure 2:
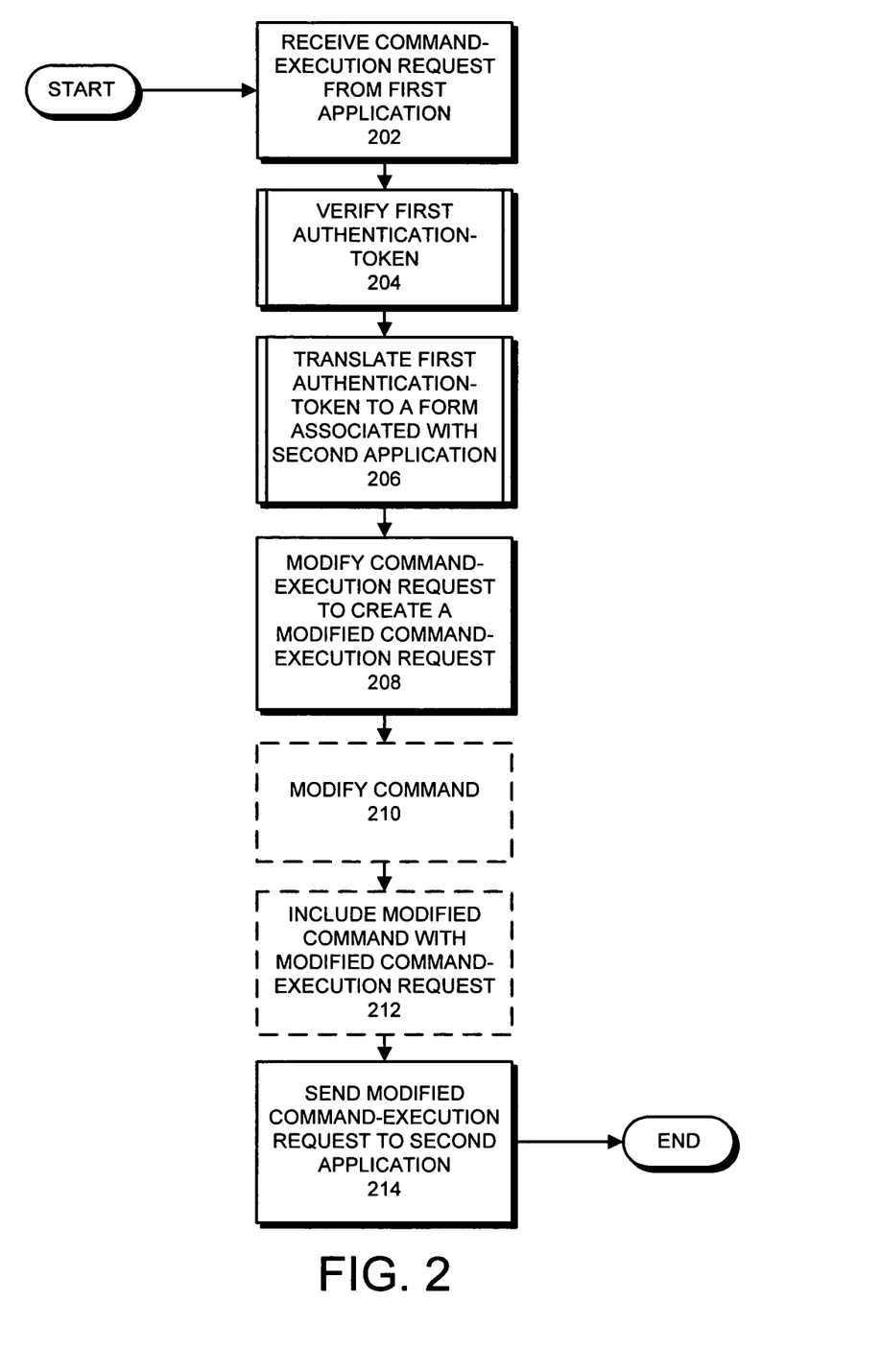
FIG. 2 presents a flowchart illustrating the process of translating a command-execution request from a format associated with a first application to a format associated with a second application in accordance with an embodiment of the present invention.

FIG. 2 presents a flowchart illustrating the process of translating a command-execution request from a format associated with a first application to a format associated with a second application in accordance with an embodiment of the present invention.

The process begins when bridge 190 receives a command-execution request from application 145, which server 140 hosts (step 202). In one embodiment of the present invention, the command-execution request includes: a target Uniform Resource locator (URL), wherein the target URL specifies the location of application 165; a first authentication-token type which specifies a form of a first authentication-token, wherein the form of the first authentication-token is associated with application 145; a second authentication-token type which specifies a form of a second authentication-token, wherein the form of the second authentication-token is associated with application 165; a user identifier which is associated with the first authentication-token; payload data which allows application 165 to execute the command; and a command for application 165 to execute.

In one embodiment of the present invention, the target URL specifies the location of a web-page associated with application 165.

In one embodiment of the present invention, the target URL specifies an entry point into application 165.

In one embodiment of the present invention, the command-execution request can specify the location of application 165, or an entry point into application 165 using any protocol known to those familiar with the art.

Next, bridge 190 verifies the validity of a first authentication-token, which is included with the command-execution request (step 204). Note that this is a multi-step process, which is described in more detail below with reference to FIG. 3.

In one embodiment of the present invention, the first authentication-token can include a cookie, a digital certificate, a user-name/password pair, a cryptographic key, a biometric identifier, and any other form of authentication-token known to those familiar with the art.

After verifying the validity of the first authentication-token, bridge 190 translates the first authentication-token to a form associated with application 165 to obtain a second authentication-token (step 206). Note that this is a multi-step process, which is described in more detail below with reference to FIG. 4.

In one embodiment of the present invention, the second authentication-token can include a cookie, a digital certificate, a user-name/password pair, a cryptographic key, a biometric identifier, and any other form of authentication-token known to those familiar with the art.

In one embodiment of the present invention, server 140 hosts both application 145 and application 165.

In one embodiment of the present invention, application 145 and application 165 are two components of the same application.

Next, bridge 190 modifies the command-execution request to create a modified command-execution request by replacing the first authentication-token with the second authentication-token (step 208).

In one embodiment of the present invention, bridge 190 modifies the command received from application 145 to create a modified command (step 210). To create this modified command, bridge 190 alters the format of the command to match a format associated with application 165. This allows application 165 to execute the command. After creating the modified command, bridge 190 includes the modified command with the modified command-execution request (step 212). For example, in one embodiment of the present invention, application 145 formats a command in the following order: a command type, a variable, and then a value for the variable. However, application 165 formats the same command to specify the command type after the value for the variable. Thus, for application 165 to execute a command issued by application 145, bridge 190 re-formats the command from application 145 to match the command-format associated with application 165. These steps are optional as illustrated by the dashed lines surrounding steps 210 and 212.

Once bridge 190 has finished creating the modified command-execution request, bridge 190 sends the modified command-execution request to application 165 (step 214).

Verifying an Authentication-Token

Figure 3:
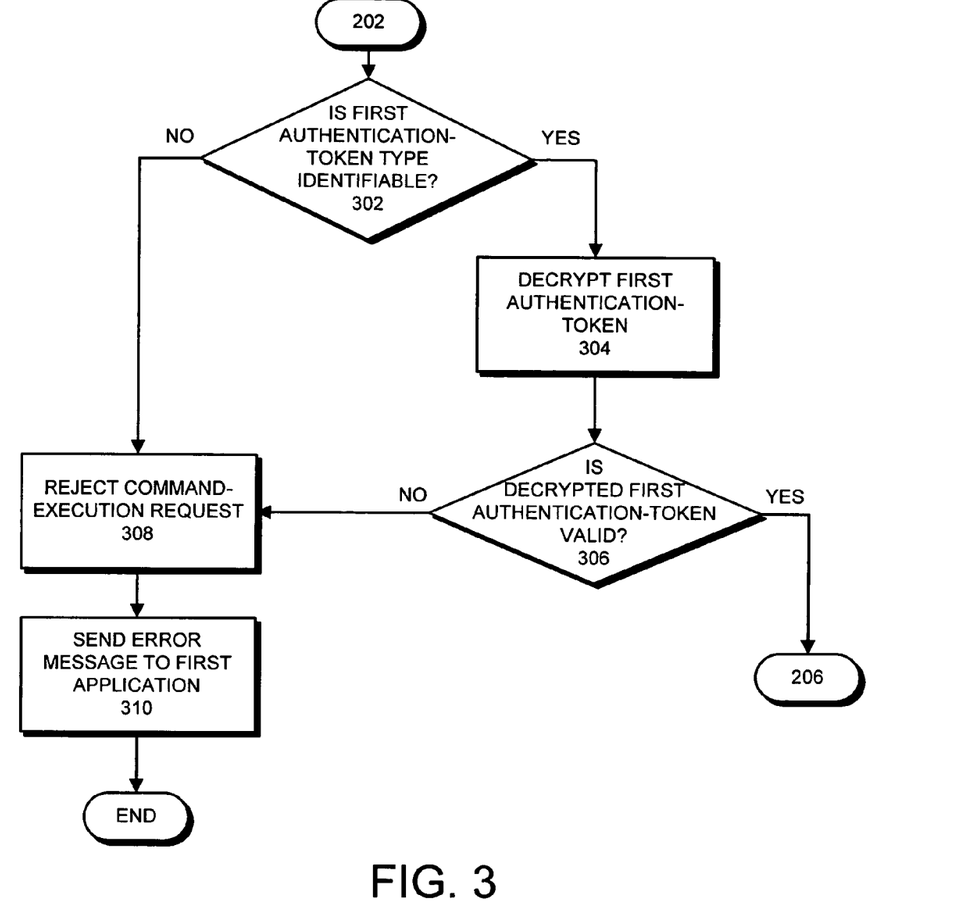
FIG. 3 presents a flowchart illustrating the process of verifying an authentication-token in accordance with an embodiment of the present invention.

FIG. 3 presents a flowchart illustrating the process of verifying an authentication-token in accordance with an embodiment of the present invention.

The process begins with bridge 190 attempting to identify a first authentication-token type for a first authentication-token included with a command-execution request (step 302).

In one embodiment of the present invention, bridge 190 attempts to identify the first authentication-token type by comparing the format of the first authentication-token to a set of known authentication-token formats. In this embodiment, administrator 122 specifies the set of known authentication-token formats to bridge 190 prior to bridge 190 receiving the command-execution request. This enables application 145 to communicate with applications that use different authentication-token types without modifying application 145.

In one embodiment of the present invention, the command-execution request specifies the first authentication-token type.

If bridge 190 is able to identify the first authentication-token type, then bridge 190 decrypts the first-authentication token using a decryption-rule associated with the first authentication-token type to obtain a decrypted first authentication-token (step 304).

In one embodiment of the present invention, bridge 190 decrypts the first authentication-token before identifying the first authentication-token type. In this embodiment, bridge 190 is capable of identifying the decryption-rule without identifying the first authentication-token type.

In one embodiment of the present invention, application 145 does not encrypt the first authentication-token, hence, bridge 190 does not have to decrypt the first authentication-token.

After decrypting the first authentication-token, bridge 190 verifies the validity of the decrypted first authentication-token (step 306). Verifying the validity of the decrypted first authentication-token can involve: verifying that the decrypted first authentication-token has not expired; verifying that the decrypted first authentication-token is associated with a user identifier, wherein the user identifier is associated with user 112; verifying that the decrypted first authentication-token has not been tampered with; and any other token-verification process known to those familiar with the art.

In one embodiment of the present invention, verifying that the decrypted first authentication-token has not been tampered with can involve: verifying a hash value associated with the decrypted first authentication-token; verifying a digital certificate associated with the decrypted first authentication-token; verifying a cryptographic key associated with the decrypted first authentication-token; and any other process for identifying if the decrypted first authentication-token has been tampered with known to those familiar with the art.

If bridge 190 determines that the decrypted first authentication-token is valid, then bridge 190 proceeds to step 206. If bridge 190 is not able to identify the first authentication-token type, or if bridge 190 determines that the decrypted first authentication-token is not valid, then bridge 190 rejects the command-execution request (step 308). Bridge 190 then sends an error message to application 145 (step 310). At this point, the process ends, and bridge 190 does not continue to step 206.

In one embodiment of the present invention, sending the error message can include reporting that the authentication-token is expired, reporting that the authentication-token is invalid, reporting that bridge 190 cannot determine how to translate the authentication-token to a format associated with application 165, reporting that bridge 190 is unavailable, and reporting any other error-message type known to those familiar with the art.

In one embodiment of the present invention, bridge 190 can request that user 112 re-authenticate with application 145. In this embodiment, application 145 re-sends the command-execution request after user 112 re-authenticates with application 145.

In one embodiment of the present invention, bridge 190 does not send an error message to application 145.

Translating an Authentication-Token

Figure 4:
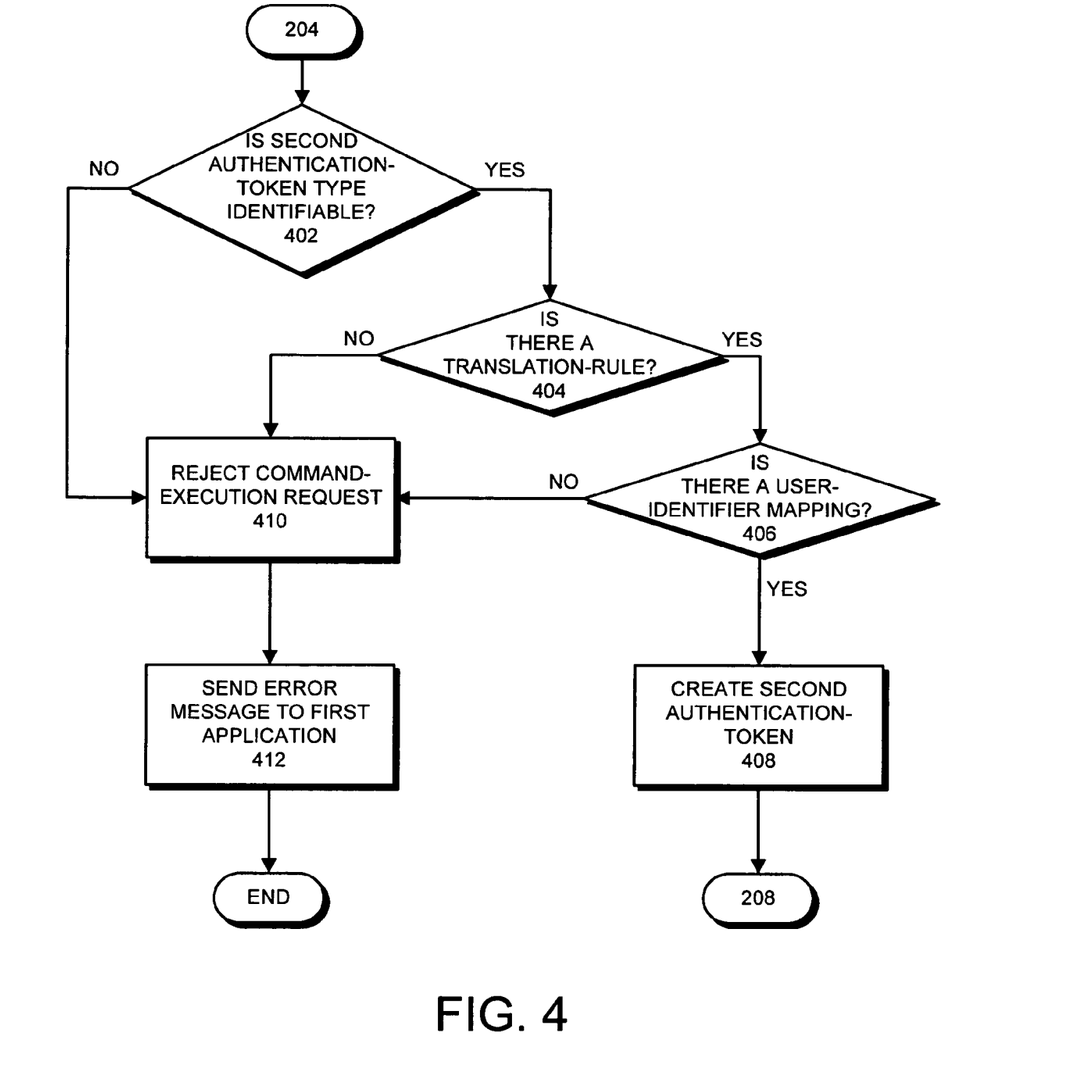
FIG. 4 presents a flowchart illustrating the process of translating a first authentication-token with a first authentication-token type to a second authentication-token type in accordance with an embodiment of the present invention.

FIG. 4 presents a flowchart illustrating the process of translating a first authentication-token associated with a first authentication-token type to a second authentication-token type in accordance with an embodiment of the present invention.

The process begins with bridge 190 attempting to identify a second authentication-token type, wherein the second authentication-token type is associated with application 165 (step 402). In one embodiment of the present invention, bridge 190 determines the second authentication-token type based on a target application, such as application 165, of the command-execution request. In this embodiment, administrator 122 associates the second authentication-token type with application 165 prior to bridge 190 receiving the command-execution request.

In one embodiment of the present invention, application 145 includes the second authentication-token type with the command-execution request.

If bridge 190 is successful in identifying the second authentication-token type, then bridge 190 determines if there is a translation-rule associated with the first authentication-token type and the second authentication-token type (step 404). Note that the translation-rule specifies how to translate the first authentication-token into the format associated with the second-authentication token type to obtain the second authentication-token. In one embodiment of the present invention, administrator 122 associates the translation-rule with the first authentication-token type and the second authentication-token type prior to bridge 190 receiving the command-execution request.

If bridge 190 is successful in identifying a translation-rule associated with the second authentication-token type, then bridge 190 determines if there is a user-identifier mapping (step 406). Note that the user-identifier mapping specifies a second user identifier for a given combination of first user identifier, first authentication-token type, and second authentication-token type. Bridge 190 includes the second user identifier with the modified command-execution request that bridge 190 sends to application 165.

In one embodiment of the present invention, the first user identifier and the second user identifier are the same user identifiers.

If bridge 190 is successful in identifying a user-identifier mapping, then bridge 190 uses the translation-rule to create a second authentication-token of the second authentication-token type (step 408). Bridge 190 then proceeds to execute step 208.

In one embodiment of the present invention, bridge 190 uses a combination of the translation-rule and the user-identifier mapping to facilitate in creating the second authentication-token.

In one embodiment of the present invention, bridge 190 creates the second authentication-token by requesting the second authentication-token from a third-party, such as server 150, associated with the second authentication-token type. For example, if the second authentication-token type indicates that application 165 requires a digital certificate to authenticate user 112, and that server 150 is a certificate authority, then bridge 190 can contact server 150 to obtain the digital certificate. Server 150 can then send the second authentication-token to bridge 190.

If bridge 190 cannot identify the second authentication-token type, a translation-rule, or a user-identifier mapping, then bridge 190 rejects the command-execution request (step 410). Bridge 190 then sends an error message to application 145 (step 412). At this point, the process ends, and bridge 190 does not continue to step 208.

In one embodiment of the present invention, sending the error message can include reporting that the authentication-token is expired, that the authentication-token is invalid, that bridge 190 cannot determine how to translate the authentication-token to a format associated with application 165, that bridge 190 is unavailable, and any other error-message type known to those familiar with the art.

In one embodiment of the present invention, bridge 190 can contact user 112 to request identification of the first authentication-token type, second authentication-token type, a translation-rule, or a user-identifier mapping. In this embodiment, bridge 190 can store user 112's response to this request. Thus, if bridge 190 receives a second command-execution request from user 112, bridge 190 will be able to complete the request without user 112's assistance. Note that this embodiment can enable user 112 to program bridge 190 to perform authentication-token translations that are in addition to those programmed by administrator 122.

In one embodiment of the present invention, bridge 190 can contact administrator 122 to request identification of the first authentication-token type, second authentication-token type, a translation-rule, or a user-identifier mapping. In this embodiment, administrator 122 does not need to specify the set of known authentication-token formats, associate the authentication-token formats with the applicable applications, specify a translation-rule, or specify a user-identifier mapping prior to bridge 190 receiving the command-execution request.

In one embodiment of the present invention, bridge 190 does not send an error message to application 145.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for converting authentication-tokens, comprising:

receiving, at a computer, a command-execution request from a first application, wherein the command-execution request specifies a command to be executed by a second application and includes a first authentication-token that is created by the first application based on a user authenticating to the first application;

verifying the first authentication-token at the computer;

translating the first authentication-token to a form associated with the second application to produce a second authentication-token, wherein the second authentication-token is in a form different than the first authentication-token;

modifying the command-execution request by replacing the first authentication-token with the second authentication-token to create a modified command-execution request; and sending the modified command-execution request to the second application, wherein the command-execution request includes a target Uniform Resource Locator (URL) which specifies a location of the second application, a second authentication-token type which specifies a form of the second authentication-token, a user identifier for a user who is associated with the first authentication-token, and payload data for the second application.

2. The method of claim 1, wherein the first application is located on the same computer system as the second application.

3. The method of claim 1, wherein the command-execution request comprises a first authentication-token type which specifies a form of the first authentication-token.

4. The method of claim 1, wherein verifying the first authentication-token further comprises:
identifying a first authentication-token type for the first authentication-token;
using decryption rules associated with the first authentication-token type to decrypt the first authentication-token to produce a decrypted first authentication-token; and
verifying the validity of the decrypted first authentication-token.

5. The method of claim 4, wherein verifying the validity of the decrypted first authentication-token can involve:
verifying that the decrypted first authentication-token has not expired; and
verifying that the decrypted first authentication-token is associated with a user identifier.

6. The method of claim 1, wherein translating the first authentication-token further comprises:
identifying the second authentication-token type;
identifying a second user identifier which is mapped from the user identifier; and
creating the second authentication-token associated with the second user identifier, wherein the second authentication-token is of the form specified by the second-authentication-token type.

7. The method of claim 6, wherein creating the second authentication-token can involve:
requesting the second authentication-token from a third-party authentication-token provider; and
receiving the second authentication-token from the third-party authentication-token provider.

8. The method of claim 6, wherein the second user identifier comprises the user identifier.

9. The method of claim 1, wherein the first authentication-token and the second authentication-token include one or more of:
a cookie;
a digital certificate;
a user-name/password pair;
a cryptographic key; and
a biometric identifier.

10. The method of claim 1, wherein modifying the command-execution request further comprises:
modifying a format of the command to a format associated with the second application; and
including the modified command with the modified command-execution request.

11. A non-transitory computer-readable storage medium storing instructions that when executed by a computer cause the computer to perform a method for converting authentication-tokens, the method comprising:
receiving, at a bridge, a command-execution request from a first application, wherein the command-execution request specifies a command to be executed by a second application and includes a first authentication-token that is created by the first application based on a user authenticating to the first application;
verifying the first authentication-token at the bridge;
translating the first authentication-token to a form associated with the second application to produce a second authentication-token, wherein the second authentication-token is in a form different than the first authentication-token;
modifying the command-execution request by replacing the first authentication-token with the second authentication-token to create a modified command-execution request; and
sending the modified command-execution request to the second application,
wherein the command-execution request includes a target Uniform Resource Locator (URL) which specifies a location of the second application, a second authentication-token type which specifies a form of the second authentication-token, a user identifier for a user who is associated with the first authentication-token, and payload data for the second application.

12. The computer-readable storage medium of claim 11, wherein the first application is located on the same computer system as the second application.

13. The computer-readable storage medium of claim 11, wherein the command-execution request comprises a first authentication-token type which specifies a form of the first authentication-token.

14. The computer-readable storage medium of claim 11, wherein verifying the first authentication-token further comprises:
identifying a first authentication-token type for the first authentication-token;
using decryption rules associated with the first authentication-token type to decrypt the first authentication-token to produce authentication-token; and
verifying the validity of the decrypted first authentication-token.

15. The computer-readable storage medium of claim 14, wherein verifying the validity of the decrypted first authentication-token can involve:
verifying that the decrypted first authentication-token has not expired; and
verifying that the decrypted first authentication-token is associated with a user identifier.

16. The computer-readable storage medium of claim 11, wherein translating the first authentication-token further comprises:
identifying the second authentication-token type;
identifying a second user identifier which is mapped from and the user identifier; and
creating the second authentication-token associated with the second user identifier, wherein the second authentication-token is of the form specified by the second-authentication-token type.

17. The computer-readable storage medium of claim 16, wherein creating the second authentication-token can involve:
requesting the second authentication-token from a third-party authentication-token provider; and
receiving the second authentication-token from the third-party authentication-token provider.

18. The computer-readable storage medium of claim 16, wherein the second user identifier comprises the user identifier.

19. The computer-readable storage medium of claim 11, wherein the first authentication-token and the second authentication-token include one or more of:
a cookie;
a digital certificate;
a user-name/password pair;

a cryptographic key; and a biometric identifier.

20. The computer-readable storage medium of claim 11, wherein modifying the command-execution request further comprises:

modifying a format of the command to a format associated with the second application; and including the modified command with the modified command-execution request.

21. An apparatus that converts authentication-tokens, comprising:

a receiving mechanism configured to receive, at a bridge, a command-execution request from a first application, wherein the command-execution request specifies a command to be executed by a second application and includes a first authentication-token that is created by the first application based on a user authenticating to the first application;

a verification mechanism configured to verify the first authentication token at the bridge;

a translation mechanism configured to translate the first authentication-token to a form associated with the second application to produce a second authentication-token, wherein the second authentication-token is in a form different than the first authentication-token;

a modification mechanism configured to modify the command-execution request by replacing the first authentication-token with the second authentication-token to create a modified command-execution request; and a sending mechanism configured to send the modified command-execution request to the second application, wherein the command-execution request includes a target Uniform Resource Locator (URL) which specifies a location of the second application, a second authentication-token type which specifies a form of the second authentication-token, a user identifier for a user who is associated with the first authentication-token, and payload data for the second application.

22. The apparatus of claim 21, wherein the verification mechanism further comprises:

an identification mechanism configured to identify a first authentication-token type for the first authentication-token;

a decryption mechanism configured to use decryption rules associated with the first authentication-token type to decrypt the first authentication-token to produce a decrypted first authentication-token; and a second verification mechanism configured to verify the validity of the decrypted first authentication-token.

23. The apparatus of claim 21, wherein the translation mechanism further comprises:

an identification mechanism configured to identify the second authentication-token type;

a second identification mechanism configured to identify a second user identifier which is mapped from and the user identifier; and a creation mechanism configured to create the second authentication-token associated with the second user identifier, wherein the second authentication-token is of the form specified by the second-authentication-token type.

24. The apparatus of claim 22, wherein the second verification mechanism is further configured to:

verify that the decrypted first authentication-token has not expired; and to verify that the decrypted first authentication-token is associated with a user identifier.

25. The apparatus of claim 23, wherein the creation mechanism further comprises:

a requesting mechanism configured to request the second authentication-token from a third-party authentication-token provider; and a receiving mechanism configured to receive the second authentication-token from the third-party authentication-token provider.

26. The apparatus of claim 21, wherein the modification mechanism is further configured to:

modify a format of the command to a format associated with the second application; and to include the modified command with the modified command-execution request.

* * * * *